US010432526B2

United States Patent
Gafni et al.

(10) Patent No.: US 10,432,526 B2
(45) Date of Patent: Oct. 1, 2019

(54) ENHANCED TRAFFIC DISTRIBUTION USING VRF TABLES

(71) Applicant: Mellanox Technologies TLV Ltd., Raanana (IL)

(72) Inventors: Barak Gafni, Campbell, CA (US); Matty Kadosh, Hadera (IL); Aviv Kfir, Nili (IL)

(73) Assignee: Mellanox Technologies TLV Ltd., Raanana (IL)

( * ) Notice: Subject to any disclaimer, the term of this patent is extended or adjusted under 35 U.S.C. 154(b) by 47 days.

(21) Appl. No.: 15/713,776

(22) Filed: Sep. 25, 2017

(65) Prior Publication Data

US 2019/0097929 A1   Mar. 28, 2019

(51) Int. Cl.
| | |
|---|---|
| *H04L 12/743* | (2013.01) |
| *H04L 12/741* | (2013.01) |
| *H04L 12/713* | (2013.01) |
| *H04L 12/46* | (2006.01) |

(52) U.S. Cl.
CPC ...... *H04L 45/7453* (2013.01); *H04L 12/4645* (2013.01); *H04L 45/54* (2013.01); *H04L 45/586* (2013.01)

(58) Field of Classification Search
CPC .................................................. H04L 45/7453
USPC ........................................................ 370/356
See application file for complete search history.

(56) References Cited

U.S. PATENT DOCUMENTS

| 7,190,696 | B1 | 3/2007 | Manur et al. |
| 8,004,990 | B1 | 8/2011 | Callon |
| 9,019,962 | B1 * | 4/2015 | Ghosh ................. H04L 49/3009 370/392 |
| 9,853,900 | B1 | 12/2017 | Mula et al. |
| 10,116,567 | B1 * | 10/2018 | Singh .................... H04L 47/122 |
| 2008/0181103 | A1 | 7/2008 | Davies et al. |
| 2012/0163389 | A1 | 6/2012 | Zhang et al. |
| 2013/0039169 | A1 | 2/2013 | Schlansker et al. |
| 2013/0201989 | A1 | 8/2013 | Hu et al. |
| 2013/0279503 | A1 | 10/2013 | Chiabaut |
| 2013/0308444 | A1 | 11/2013 | Sem-Jacobsen et al. |
| 2015/0163146 | A1 | 6/2015 | Zhang et al. |
| 2015/0281082 | A1 | 10/2015 | Rajahalme |
| 2015/0372916 | A1 | 12/2015 | Haramaty et al. |
| 2016/0134535 | A1 | 5/2016 | Callon |
| 2017/0048144 | A1 | 2/2017 | Liu |

(Continued)

*Primary Examiner* — Shripal K Khajuria
(74) *Attorney, Agent, or Firm* — Kligler & Associates

(57) ABSTRACT

Communication apparatus includes a plurality of interfaces and routing logic coupled between the interfaces. The routing logic includes a parser, which extracts header data from selected fields of each data packet received from the network through an ingress interface. At least one hash calculator computes a hash over a first set of the header data extracted by the parser from each received data packet. A virtual routing and forwarding (VRF) instance selector selects a VRF instance for each received data packet responsively to both an ingress indicator associated with the received data packet and a second set of the header data extracted by the parser from the received data packet. A lookup engine selects an egress interface responsively to the selected VRF instance and the computed hash. Forwarding and switching logic forwards the data packet to the selected egress interface for transmission to the network.

15 Claims, 3 Drawing Sheets

(56) References Cited

U.S. PATENT DOCUMENTS

2017/0070425 A1    3/2017   Mithyantha
2017/0085630 A1    3/2017   Luo et al.

\* cited by examiner

ENHANCED TRAFFIC DISTRIBUTION USING VRF TABLES

FIELD OF THE INVENTION

The present invention relates generally to packet network communications, and particularly to apparatus and methods for packet routing.

BACKGROUND

Routers in a computer network, such as an Internet Protocol (IP) network, often route packets from a given source to a given destination (as identified by the respective source and destination addresses) over different, parallel data paths. For example, the network may comprise multiple interconnected intermediate devices, such as routers and/or other switching elements, which provide connectivity between an inbound router and an outbound router. As a result, some of the packets traveling between a given source and a given destination may make use of one path, while other packets between the same source and destination make use of one or more alternative paths.

In modern IP networks, routers maintain mappings for distributing traffic flows among different, parallel data paths of this sort. Each path is identified by its next hop from the router and is thus associated with the respective egress interface of the router from which this next hop originates. As the router receives packets, it associates each packet with a particular packet flow and distributes the packets among its egress interfaces using the mapping of flows to data paths. A "flow" in this context refers to a specific sequence of packets transmitted within a certain time frame from a given source to a given destination. The flow can be identified, for example, on the basis of a set of header field shared by all the packets in the flow, such as the fields in the IP 5-tuple (source and destination IP addresses, source and destination ports, and protocol identifier). Distribution of the flows among the egress interfaces in this manner is useful in balancing the load of network traffic among the different paths.

In this regard, for example, U.S. Pat. No. 8,004,990 describes techniques for distributing network traffic across parallel data paths. A router may perform a hash on routing information of the packet to generate a hash value corresponding to the packet flow associated with the packet. The router may map the hash value of the packet to a forwarding element associated with a data path. The router may dynamically update the mapping of hash values to forwarding elements in accordance with traffic flow statistics. In this manner, the router may distribute the packet flows from data paths with high volumes of traffic to data paths with smaller volumes of traffic.

Virtual routing and forwarding (VRF) is a technology implemented in IP routers that allows multiple instances of a routing table to exist in a router and work simultaneously. VRF uses a forwarding table for each VRF instance to designate the next hop for each data packet, as well as a set of rules and routing protocols that govern how the packet is to be forwarded. Because the VRF routing instances are independent, the same or overlapping IP addresses can be used in different instances without conflicting with one another, and network paths can be segmented without requiring multiple routers. Because the traffic is automatically segregated, VRF also increases network security and can mitigate the need for encryption and authentication.

SUMMARY

Embodiments of the present invention that are described hereinbelow provide improved methods and apparatus for packet routing and forwarding.

There is therefore provided, in accordance with an embodiment of the invention, communication apparatus, including a plurality of interfaces configured to serve as ingress interfaces, which receive data packets from a network, and egress interfaces, which transmit the data packets to the network. Routing logic is coupled between the interfaces and includes a parser, which is configured to extract header data from selected fields of each data packet received from the network through an ingress interface of the apparatus. At least one hash calculator is configured to compute a predefined hash over a first set of the header data extracted by the parser from each received data packet. A virtual routing and forwarding (VRF) instance selector is configured to select a VRF instance for each received data packet responsively to both an ingress indicator associated with the received data packet and a second set of the header data extracted by the parser from the received data packet. A lookup engine is configured to select an egress interface responsively to the selected VRF instance and the computed hash. Forwarding and switching logic is configured to forward the data packet to the selected egress interface for transmission to the network.

In the disclosed embodiments, the ingress indicator used by the VRF instance selector is selected from a set of indicators consisting of the ingress interface through which the data packet was received and a virtual local area network (VLAN) over which the data packet was received.

In some embodiments, the predefined hash is a first hash computed over the first set of the header data, and the at least one hash calculator is configured to compute a second hash over the second set of the header data for use by the VRF selector in selecting the VRF instance.

In some embodiments, the second set of the header data is disjoint from the first set of the header data.

In a disclosed embodiment, the lookup engine includes a routing group selector, which is configured to select a multi-path group of the egress interfaces responsively to the selected VRF instance and to a destination address of the received data packet, and a next-hop selector, which is configured to which is configured to select the egress interface from the selected multi-path group responsively to the computed hash.

There is also provided, in accordance with an embodiment of the invention, a method for communication, which includes receiving a data packet from a network through an ingress interface of a router and extracting, in the router, header data from selected fields of the data packet. The router computes a predefined hash over a first set of the header data and selects a virtual routing and forwarding (VRF) instance responsively to both an ingress indicator associated with the received data packet and a second set of the header data extracted from the received data packet. An egress interface of the router is selected responsively to the selected VRF instance and the computed hash, and the data packet is forwarded to the selected egress interface for transmission from the router to the network.

DETAILED DESCRIPTION OF EMBODIMENTS

Figure 1:
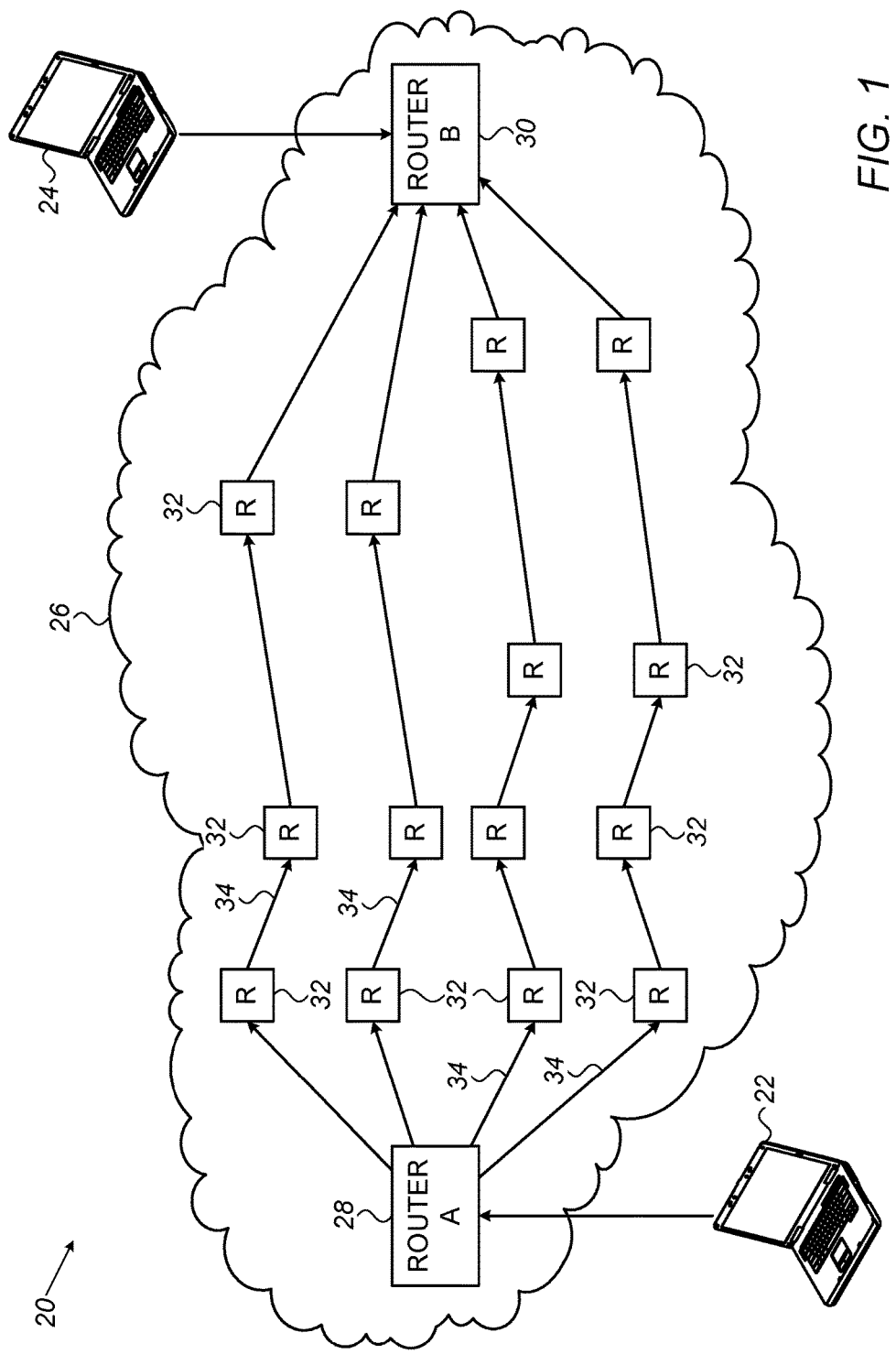
FIG. 1 is a block diagram that schematically illustrates a computer communication system, in accordance with an embodiment of the invention.

In multi-path routing schemes that are known in the art, a router typically assigns a received packet to one of a number of alternative data paths by performing a hash on a portion of routing information contained in the packet header to generate a hash value, which is then applied to a lookup table. The hash function generates a range of hash values, depending on the packet header, and each packet when hashed corresponds to exactly one of the hash values. The "granularity" of the hash, i.e., the number of different hash values that will be generated, depends on the amount of routing information included in the computation (or equivalently, the number of header fields whose values go into the hash computation).

The router maps each of the possible hash values to one of the available data paths, which is associated in the router with a respective next hop through the network, originating from one of the egress interfaces of the router. It thus follows that the number of alternative data paths to which packets directed to a given destination address can be mapped (or equivalently, the number of different egress interfaces through which the router will forward such packets) depends on the number of different hash values generated by the header fields of these packets. In large networks made up of routers with many interfaces in a dense mesh, the number of different hash values computed over the accepted set of header data (for example, the IP 5-tuple) may not be sufficient to distribute traffic over all the egress interfaces available for transmission to a given destination. In addition, existing routers are often restricted to a certain multi-path group size in mapping the hash values to the interfaces.

Embodiments of the present invention that are described herein address this limitation by making novel use of the VRF functionality of the router. Ordinarily, as explained above, VRF provides a single routing instance for each incoming packet based on a specified ingress indicator, such as the ingress interface or the virtual local area network (VLAN) through which the packet was received in the router. In other words, all of the packets received by the router through a given interface or over a given VLAN (as identified by the VLAN tag of the packets) will be assigned to the same routing instance.

The present embodiments break this accepted paradigm, however, by using the VRF functionality of the router to select a VRF instance for each received packet based both on the ingress indicator associated with the packet, as defined above, and on an additional set of header data extracted from the packet. This additional set of header data may be disjoint from the set of header data that is used in calculating the hash for routing purposes, or the two sets may overlap. The router may compute a hash over the additional set of header data as an input to VRF selection, for example, or it may use certain header field values directly for this purpose.

In any case, the incorporation of the additional header data adds entropy in choosing the VRF, with the result that packets received through a given interface or over a VLAN will be mapped to multiple different VRF instances, and hence to multiple different routing instances. Consequently, the granularity of selection of egress interfaces for packet flows to a given destination address is increased, and with it the ability of the router to balance traffic load among the available network paths. This added granularity is achieved by leveraging the VRF functionality that already exists in most modern routers, thus avoiding the need for major modifications to the router components.

FIG. 1 is a block diagram that schematically illustrates a computer communication system 20, in accordance with an embodiment of the invention. In the pictured scenario, a source computer 22 transmits multiple flows of data packets to a destination computer 24 through a network 26. In the description that follows, network 26 is assumed to be an IP network and to operate in accordance with the IP protocol suite. In alternative embodiments, however, the principles of the present invention may be applied in other sorts of networks and using other protocols in which multi-path routing schemes are applied.

Packet flows originating from source computer 22 enter network 26 via an ingress router 28 (marked ROUTER A) in the figure. Router 28 forwards these packets through network, via intermediate routers 32, to an egress router (marked ROUTER B), which passes the packets to destination computer 24. Router 28 applies a multi-path routing scheme, as described further hereinbelow, in transmitting the flows over multiple alternative paths 34 through network 26, traversing different sets of intermediate routers 32.

Figure 2:
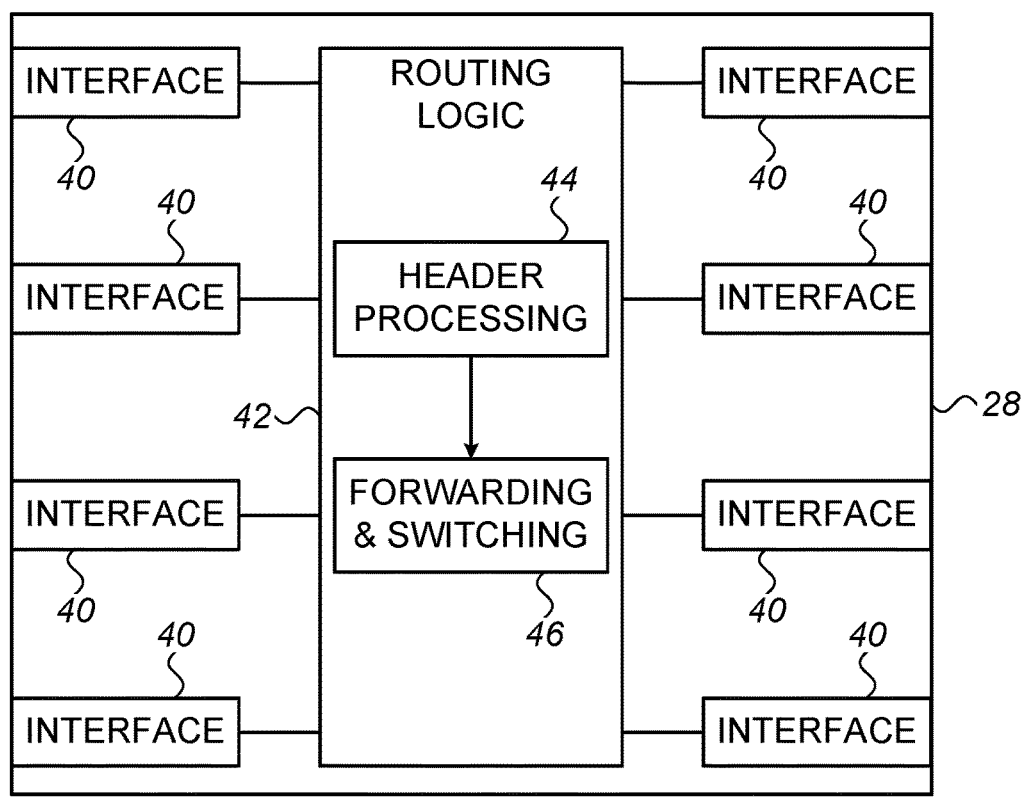
FIG. 2 is a block diagram that schematically illustrates a packet router, in accordance with an embodiment of the invention.

FIG. 2 is a block diagram that schematically illustrates functional components of router 28, in accordance with an embodiment of the invention. Other routers 30, 32 in network 26 are typically of similar design. For the sake of simplicity, only those elements of router 28 that are necessary to an understanding of the multi-path functionality of the router are shown and described here. The remaining components of router 28, as well as their integration with the elements shown in FIG. 2, will be apparent to those skilled in the art after reading the present description.

Router 28 comprises multiple interfaces 40 connected to network 26. Interfaces 40 generally serve both as ingress interfaces, to receive data packets from network 26, and egress interfaces, which transmit the data packets to the network. Interfaces 40 are typically based on network ports, comprising physical layer (PHY) and data link layer (MAC) components, as are known in the art, such as high-speed Ethernet PHY and MAC circuits. Interfaces 40 also comprise or are associated with ingress and egress buffers, in the form of memory for temporarily storing incoming and outgoing packets. The buffers may be locally connected to the network ports or centrally shared among the ports, or both.

Routing logic 42 is coupled between interfaces 40 and is responsible for transferring data packets received from the network from their respective ingress interfaces to the appropriate egress interfaces. Routing logic 42 comprises header processing circuits 44, which select the appropriate egress interface for each incoming packet, based on header data from selected fields of the packet. Header processing circuits 44 implement VRF and multi-path routing functions as described in greater detail hereinbelow. Forwarding and switching logic 46 then forwards the packets to the respectively-selected egress interfaces 40 for transmission to network 26.

Typically, routing logic 42 comprises hard-wired and/or programmable digital hardware logic circuits, which carry out the functions that are described herein, along with other packet handling functions that are known in the art. Alternatively, some of the functions of routing logic may be carried out in software or firmware by a programmable processor. In some embodiments, the elements of router 28 are embodied in a single integrated circuit (IC) chip, including routing logic 42 and other components, possibly including interfaces 40. Alternatively, router may comprise multiple chips with suitable interconnections.

Figure 3:
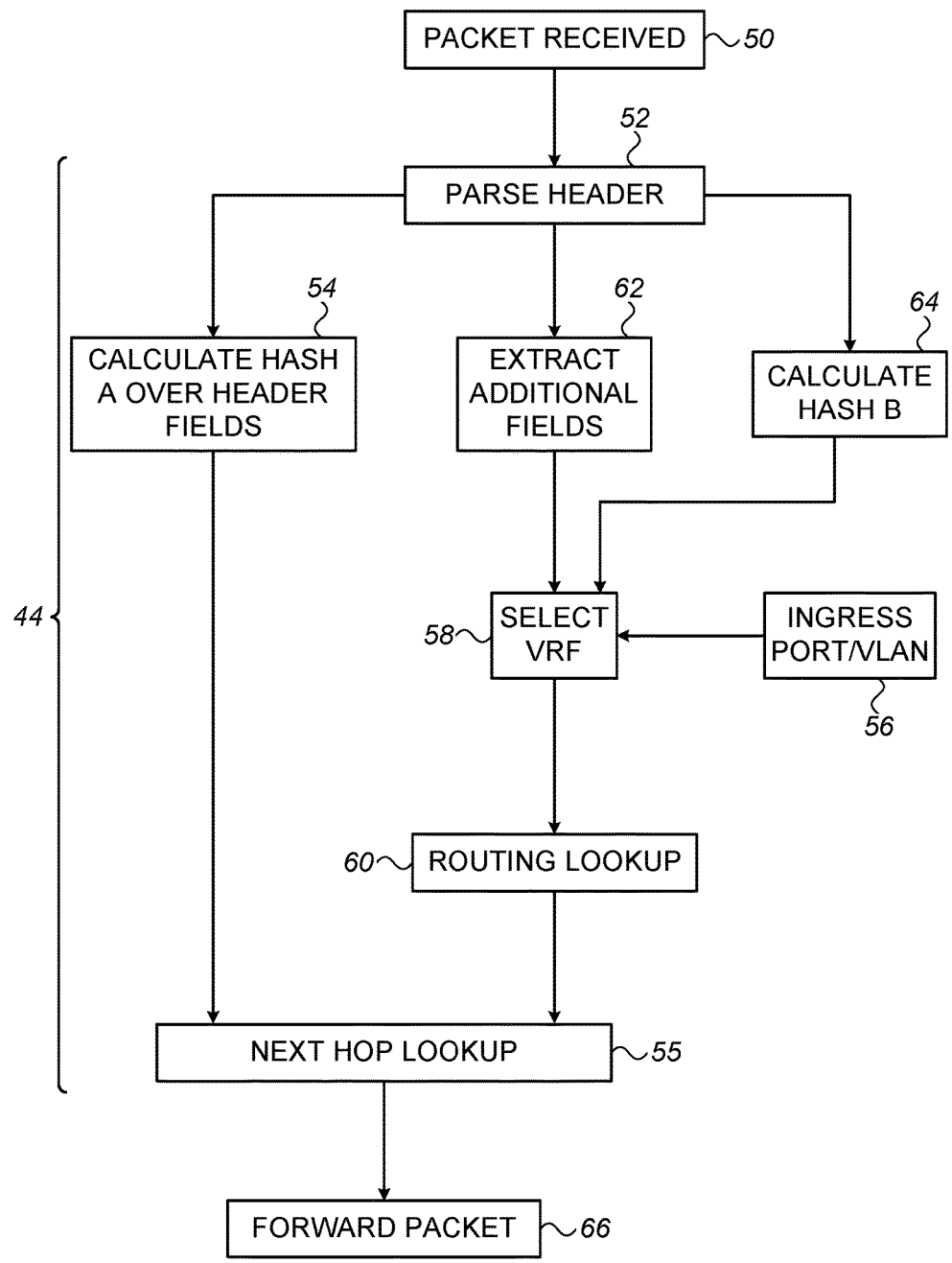
FIG. 3 is a flow chart that schematically shows details of the operation of header processing logic in a router, in accordance with an embodiment of the invention.

FIG. 3 is a flow chart that schematically shows details of the operation of header processing logic 44, in accordance with an embodiment of the invention. The operation of header processing logic 44 is triggered by receipt of an incoming data packet 50 through one of interfaces 40, which serves as the ingress interface for the packet. A parser 52 parses and extracts header data from selected fields of each such received packet. The extracted header data typically include a set of data including the values of the source and destination address fields, and possibly the entire IP 5-tuple, as defined above. This set of data is input to a hash calculator 54, which computes a predefined hash over the data, using any suitable hash function that is known in the art (referred to in FIG. 3 as "HASH A"). The hash result is input to a next hop selector 55, which will use the result in looking up the next hop that the packet is to take through network 26, and thus select the egress interface 40 through which the packet is to be transmitted.

A virtual routing and forwarding (VRF) instance selector 58 select a respective VRF instance for each received data packet. As in routers that are known in the art, one of the factors used by VRF instance selector 58 in selecting the VRF instance is an ingress indicator 56 that is associated with the received data packet. For example, ingress indicator 56 may depend on the ingress interface 40 through which the packet was received in router 28 and/or the VLAN over which the packet was received, as indicated by the VLAN tag in the packet header.

In addition, parser 52 extracts a further set of header data from the received packet for use by VRF instance selector 58. For this purpose, parser 52 may extract the values of additional header fields 62, which are disjoint from the set of the header data used by hash calculator 54. For example, the additional fields may be taken from the medium access control (MAC) header of the packet, such as the source MAC address, or from the transport header, such as the header specified by the User Datagram Protocol (UDP) or the Transmission Control Protocol (TCP).

Additionally or alternatively, parser 52 may pass the values of certain header fields to an additional hash calculator 64, which computes a second hash over this second set of the header data (referred to as "HASH B") for use by the VRF instance selector. Hash calculators 54 and 64 may be implemented as a single computation unit, which performs both hash computations simultaneously or sequentially, or alternatively as separate computational elements. Hash calculators 54 and 64 may implement the same or different hash functions, and may even operate on overlapping sets of data, although it is desirable that the hash calculations use different seeds so that the hash results will be different.

VRF instance selector 58 uses both ingress indicator 56 and one or both of additional header fields 62 and the hash result from hash calculator 64 in selecting a VRF instance. Consequently, a given ingress indicator can give rise to multiple different VRF selections, rather than only a single VRF selection as in routers that are known in the art.

VRF instance selector 58 passes an indicator of the selected VRF instance (for example, a VRF index value) to a routing group selector 60, which applies this information together with the destination address of the received packet in selecting the multi-path group to which the packet is to be assigned. For example, routing group selector 60 may look up the multi-path group in a table using a longest-prefix match of the VRF index value and the destination IP address of the packet. Routing group selector 60 outputs a pointer to this multi-path group to next-hop selector 55, which looks up the next hop for the packet within the selected multi-path group using the hash result from hash calculator 54.

Routing group selector 60 and next hop selector 55 function together as a lookup engine, which thus selects the egress interface 40 for the packet based on both the selected VRF instance and the computed hash. Forwarding and switching logic 46 accordingly forwards an outgoing data packet 66 to the selected egress interface for transmission to network 26.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
    a plurality of interfaces configured to serve as ingress interfaces, which receive data packets from a network, and egress interfaces, which transmit the data packets to the network; and
    routing logic, which is coupled between the interfaces and is configured to extract header data from selected fields of each data packet received from the network through an ingress interface of the apparatus;
        to compute a predefined hash over a first set of the header data extracted from each received data packet;
        to select a virtual routing and forwarding (VRF) instance for each received data packet responsively to both an ingress indicator associated with the received data packet and a second set of the header data extracted from the received data packet;
        to select an egress interface responsively to the selected VRF instance and the computed hash; and
        to forward the data packet to the selected egress interface for transmission to the network.

2. The apparatus according to claim 1, wherein the ingress indicator used by the VRF instance selector is selected from a set of indicators consisting of the ingress interface through which the data packet was received and a virtual local area network (VLAN) over which the data packet was received.

3. The apparatus according to claim 1, wherein the predefined hash is a first hash computed over the first set of the header data, and wherein the routing logic is configured to compute a second hash over the second set of the header data for use by the VRF selector in selecting the VRF instance.

4. The apparatus according to claim 3, wherein the routing logic is configured to calculate both the first hash and second hash by a single computation unit.

5. The apparatus according to claim 3, wherein the routing logic is configured to calculate the first hash and second hash with different seeds.

6. The apparatus according to claim 1, wherein the second set of the header data is disjoint from the first set of the header data.

7. The apparatus according to claim 1, wherein
the routing logic is configured to select the egress interface by selecting a multi-path group of the egress interfaces responsively to the selected VRF instance and to a destination address of the received data packet; and
by selecting the egress interface from the selected multi-path group responsively to the computed hash.

8. The apparatus according to claim 1, wherein the routing logic is configured to select the VRF instance from a plurality of different VRF instances which forward a given destination to different egress interfaces.

9. The apparatus according to claim 1, wherein the second set of the header data used in selecting the VRF instance comprises one or more fields from a medium access control (MAC) header.

10. The apparatus according to claim 1, wherein the second set of the header data used in selecting the VRF instance comprises one or more fields from a transport header.

11. A method for communication, comprising:
receiving a data packet from a network through an ingress interface of a router;
extracting, in the router, header data from selected fields of the data packet;
computing, in the router, a predefined hash over a first set of the header data;
selecting, in the router, a virtual routing and forwarding (VRF) instance responsively to both an ingress indicator associated with the received data packet and a second set of the header data extracted from the received data packet;
selecting an egress interface of the router responsively to the selected VRF instance and the computed hash; and
forwarding the data packet to the selected egress interface for transmission from the router to the network.

12. The method according to claim 11, wherein the ingress indicator used in selecting the VRF instance is selected from a set of indicators consisting of the ingress interface through which the data packet was received and a virtual local area network (VLAN) over which the data packet was received.

13. The method according to claim 11, wherein computing the predefined hash comprises computing a first hash over the first set of the header data, and wherein selecting the VRF instance comprises computing a second hash over the second set of the header data and applying the second hash in selecting the VRF instance.

14. The method according to claim 11, wherein the second set of the header data is disjoint from the first set of the header data.

15. The method according to claim 11, wherein selecting the egress interface comprises:
selecting a multi-path group of the egress interfaces responsively to the selected VRF instance and to a destination address of the received data packet; and
selecting the egress interface from the selected multi-path group responsively to the computed hash.

* * * * *